(12) United States Patent  (10) Patent No.: US 6,323,481 B2
Ueki  (45) Date of Patent: *Nov. 27, 2001

(54) OPTICAL UNIT, PHOTOELECTRIC SWITCH, FIBER-TYPE PHOTOELECTRIC SWITCH, AND COLOR DISCRIMINATION SENSOR

(75) Inventor: Takahiro Ueki, Osaka (JP)

(73) Assignee: Keyence Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,120

(22) Filed: May 12, 1999

(30) Foreign Application Priority Data

May 20, 1998 (JP) .................................. 10-138941

(51) Int. Cl.$^7$ ........................................ G01N 9/04
(52) U.S. Cl. .................... 250/221; 250/226; 250/216; 340/555
(58) Field of Search ................ 250/221, 222.1, 250/226, 216; 340/555, 556, 557

(56) References Cited

U.S. PATENT DOCUMENTS

| 4,282,430 | * | 8/1981 | Hatten et al. | 250/221 |
| 5,021,645 | | 6/1991 | Satula et al. | 250/223 R |
| 5,135,300 | | 8/1992 | Toide et al. | 353/31 |
| 5,142,416 | * | 8/1992 | Nakamura et al. | 359/742 |
| 5,270,541 | * | 12/1993 | Matuzaki | 250/239 |
| 5,303,037 | * | 4/1994 | Taranowski | 250/226 |
| 5,729,327 | | 3/1998 | Narita | 355/40 |

FOREIGN PATENT DOCUMENTS

| 0 677 755 | 10/1995 | (EP) . |
| 0 709 941 | 5/1996 | (EP) . |
| 61-204782 | 9/1986 | (JP) . |

OTHER PUBLICATIONS

European Search Report document; Dec. 7, 2000.
European Search Report document; Oct. 10, 2000.

* cited by examiner

*Primary Examiner*—Stephone B. Allen
(74) *Attorney, Agent, or Firm*—Morgan, Lewis & Bockius LLP

(57) ABSTRACT

A photoelectric switch which has three light emission elements 1a, 1b, and 1c, a projection lens 3, and two dichroic mirrors 5a and 5b disposed in a holder 9 in a housing 8, and a detection light reception element 2a disposed below the holder 9. The light emission elements 1a, 1b, and 1c and the projection lens 3 are placed so that an optical axis Lc of the light emission element 1c matches an optical axis LX of the projection lens 3, that an optical axis Lb of the light emission element 1b crosses the optical axis LX of the projection lens 3 at right angles, and that an optical axis La of the light emission element 1a crosses the optical axis LX of the projection lens 3 at an acute angle. An optical fiber 6a guides light gathered through the projection lens 3 into a detection position and an optical fiber 6b guides light at the detection position into the detection light reception element 2a.

16 Claims, 6 Drawing Sheets

US 6,323,481 B2

OPTICAL UNIT, PHOTOELECTRIC SWITCH, FIBER-TYPE PHOTOELECTRIC SWITCH, AND COLOR DISCRIMINATION SENSOR

BACKGROUND OF THE INVENTION

This invention relates to an optical unit, a photoelectric switch, and a fiber-type photoelectric switch each comprising a plurality of optical elements, and a color discrimination sensor for detecting color of an object.

Hitherto, an optical unit such as a photoelectric switch has been used for emitting light to an object and receiving the light reflected on the object or the light penetrating the object, thereby detecting information on the object. With the photoelectric switch, light is emitted to a transport passage of an object and the presence or absence, the shape, the dimensions, the color, etc., of the object can be detected on the basis of the light reception quantity of the reflected light or penetrating light.

FIG. 11 is a sectional view to show an example of a photoelectric switch in a related art. In the figure, a light emission element 31 and a light reception element 32 are placed in a housing 35. Light emitted from the light emission element 31 is transmitted through a projection lens 33 to a detection position. Light from the detection position is gathered through a light reception lens 34 at the light reception element 32. If an object 37 exists at the detection position, light reflected from the object 37 is received on the light reception element 32 through the light reception lens 34. Therefore, whether or not the object 37 exists can be determined on the basis of the light reception quantity level of the light reception element 32.

A color discrimination sensor, which is also a kind of photoelectric switch, comprises a light transmission section containing a light source consisting of three light emission elements for respectively generating lights having wavelength bands corresponding to Red, Green and Blue and a projection lens for transmitting light emitted from each light emission element to an object and a light reception section having a detection light reception element for receiving light reflected from the object.

Light emitted from each of the three light emission elements is transmitted through the projection lens to the object in order and reflected light is received on the detection light reception element, then the color of the object can be determined on the basis of the light reception quantity level of each color band, for example, from comparison with reference color.

FIG. 12 is a sectional view of the main part of an optical unit having a plurality of light emission elements in a related art. In the figure, three light emission elements 41a, 41b, and 41c, a projection lens 42, and two dichroic mirrors 43a and 43b are disposed in a holder 40. The light emission element 41c is placed so that an optical axis LC of the light emission element 41c matches an optical axis LX of the projection lens 42. The light emission element 41b is placed so that an optical axis LB of the light emission element 41b crosses the optical axis LX of the projection lens 42 at right angles. The light emission element 41a is placed so that an optical axis LA of the light emission element 41a crosses the optical axis LX of the projection lens 42 at right angles.

If the light emission element 41a is turned on, light emitted from the light emission element 41a is reflected on the dichroic mirror 43a and is transmitted through the projection lens 42. If the light emission element 41b is turned on, light emitted from the light emission element 41b is reflected on the dichroic mirror 43b and the reflected light penetrates the dichroic mirror 43a and is transmitted through the projection lens 42. If the light emission element 41c is turned on, light emitted from the light emission element 41c penetrates the dichroic mirrors 43b and 43a and is transmitted through the projection lens 42.

In the example in the related art, however, if the optical path lengths from the light emission elements 41a, 41b, and 41c to the projection lens 42 differ, different focal lengths of the projection lens 42 result. Thus, the total of the optical path length from the light emission element 41a to the dichroic mirror 43a and the optical path length from the dichroic mirror 43a to the projection lens 42, the total of the optical path length from the light emission element 41b to the dichroic mirror 43b and the optical path length from the dichroic mirror 43b to the projection lens 42, and the optical path length from the light emission element 41c to the projection lens 42 are set almost equal to each other considering the light wavelength.

Therefore, the distance from the light emission element 41a at a position near the projection lens 42 to the optical axis LX of the projection lens 42 becomes long as compared with the distance from the light emission element 41b at a position distant from the projection lens 42 to the optical axis LX of the projection lens 42. Resultantly, the width of the optical unit, L0, increases and it is difficult to miniaturize the unit.

SUMMARY OF THE INVENTION

It is therefore an object of the invention to provide an optical unit, a photoelectric switch, a fiber type photoelectric switch, and a color discrimination sensor, the width of each of which can be shortened for miniaturization.

In addition, it is another object of the invention to provide an optical unit which comprises a plurality of light emission elements and is capable of adjusting the light reception detection output corresponding to each light emission element.

To the end, according to a first aspect of the invention, there is provided an optical unit for emitting or receiving light, comprising a plurality of optical elements for emitting or receiving light, a lens for transmitting or receiving light, and an optical system for guiding light from the optical elements into the lens or guiding light from the lens into the optical elements, wherein the optical elements and the lens are placed so that an optical axis of at least one of the optical elements crosses an optical axis of the lens with an inclination thereto.

According to the configuration of the optical unit, the optical system guides light emitted from the optical elements into the lens or guides light from the lens into the optical elements. In this case, the optical elements and the lens are placed so that the optical axis of at least one of the optical elements crosses the optical axis of at lens with an inclination thereto, whereby the distance between the optical element and the optical axis of the lens is shortened. Therefore, the optical unit can be miniaturized while the optical path lengths from the optical elements to the lens are held equal to each other.

In the first aspect of the invention, the optical axes of the optical elements are preferably placed in three dimensions.

According to the configuration, the optical unit can be miniaturized in the width and thickness directions.

In the first aspect of the invention, it is advantageous that the optical element of the optical elements positioned nearest to the lens is a light emission element for emitting green band light.

According to the configuration, the attenuation effect of the optical system on the light emission element for emitting green band light with the smallest light reception detection output as compared with the light emission element for emitting blue or red band light can be decreased.

According to a second aspect of the invention, there is provided a photoelectric switch for transmitting light to a detection position and receiving light reflected from the detection position or light penetrating the detection position, the photoelectric switch comprising a plurality of light emission elements for emitting light, a projection lens for transmitting light from the light emission elements to the detection position in order, an optical system for guiding light emitted from the light emission elements into the projection lens, and a light reception element for receiving light reflected from the detection position or light penetrating the detection position, wherein the light emission elements and the projection lens are placed so that an optical axis of at least one of the light emission elements crosses an optical axis of the projection lens with an inclination thereto.

According to the configuration of the photoelectric switch, the light emission elements and the projection lens are placed so that the optical axis of at least one of the light emission elements crosses the optical axis of the projection lens with an inclination thereto, whereby the distance from the light emission element to the optical axis of the projection lens is shortened and the photoelectric switch can be miniaturized.

In the second aspect of the invention, the light emission elements are preferably placed in the ascending order of light reception element output values corresponding to light emitted from the optical elements to the projection lens.

According to the configuration, the optical element which provides smaller light reception detection output can decrease the attenuation effect of the optical system more largely.

According to a third aspect of the invention, there is provided a fiber type photoelectric switch for transmitting light to a detection position and receiving light reflected from the detection position or light penetrating the detection position, the fiber type photoelectric switch comprising a plurality of light emission elements for emitting light, a projection lens for transmitting light emitted from the light emission elements, a first optical fiber for guiding the light emitted from the light emission elements and penetrating the projection lens into the detection position, a detection light reception element, and a second optical fiber for guiding the light reflected from the detection position or the light penetrating the detection position into the detection light reception element, wherein the light emission elements and the projection lens are placed so that an optical axis of at least one of the light emission elements crosses an optical axis of the projection lens with an inclination thereto.

According to the configuration of the fiber type photoelectric switch, the light emission elements and the projection lens are placed so that the optical axis of at least one of the light emission elements crosses the optical axis of the projection lens with an inclination thereto, whereby the distance between the light emission element and the optical axis of the projection lens is shortened and the fiber type photoelectric switch can be miniaturized.

In the third aspect of the invention, it is preferable that the optical elements are placed in the ascending order of light reception element output values corresponding to light emitted from the optical elements to the projection lens.

According to the configuration, the optical element which provides smaller light reception detection output can decrease the attenuation effect of the optical system more largely.

According to a fourth aspect of the invention, there is provided a color discrimination sensor for transmitting light to an object and detecting color (that is, wavelength band) of the object based on light reflected from the object, the color discrimination sensor comprising a first light emission element, a second light emission element, and a third light emission element for emitting light in different wavelength bands, a projection lens for transmitting light emitted from the first, second, and third light emission elements to the object, an optical system for guiding light emitted from the first, second, and third light emission elements into the projection lens, and a detection light reception element for receiving the light reflected from the object, wherein the first light emission element is disposed on an optical axis of the projection lens so that an optical axis of the first light emission element matches the optical axis of the projection lens, the second light emission element is placed at a position distant from the optical axis of the projection lens to the side of the projection lens from the first light emission element so that an optical axis of the second light emission element crosses the optical axis of the projection lens at right angles, and the third light emission element is placed at a position distant from the optical axis of the projection lens to the side of the projection lens from the second light emission element so that an optical axis of the third light emission element crosses the optical axis of the projection lens with an inclination thereto at an acute angle.

According to the configuration of the color discrimination sensor, the distance between the third light emission element and the optical axis of the projection lens can be shortened and the color discrimination sensor can be miniaturized.

In the fourth aspect of the invention, it is advantageous that the light emission elements are placed as the third light emission element, the second light emission element, and the first light emission element in the ascending order of light reception element output values corresponding to light emitted from the light emission elements to the projection lens.

According to the configuration, the optical element which provides smaller light reception detection output can decrease the attenuation effect of the optical system more largely.

According to a fifth aspect of the invention, there is provided an optical unit comprising a first optical element, a second optical element, and a third optical element for emitting or receiving light, a lens for transmitting or receiving light, and an optical system for guiding light from the optical elements into the lens or guiding light from the lens into the optical elements, wherein the first optical element is disposed on an optical axis of the lens so that an optical axis of the first optical element matches the optical axis of the lens, the second optical element is placed at a position distant from the optical axis of the lens to the side of the lens from the first optical element so that an optical axis of the second optical element crosses the optical axis of the lens at right angles, and the third optical element is placed at a position distant from the optical axis of the lens to the side of the lens from the second optical element so that an optical axis of the third optical element crosses the optical axis of the lens with an inclination thereto at an acute angle.

According to the configuration of the optical unit, the third optical element is placed so that the optical axis of the third optical element crosses the optical axis of the lens with an inclination thereto at an acute angle, so that the distance between the third light emission element and the optical axis of the lens is shortened and the optical unit can be miniaturized.

In the fifth aspect of the invention, it is preferable that the third optical element is a light emission element for emitting green band light.

According to the configuration, the attenuation effect of the optical system on the light emission element for emitting green band light with the smallest light reception detection output as compared with the light emission element for emitting blue or red band light can be decreased.

According to a sixth aspect of the invention, there is provided an optical unit comprising a first optical element, a second optical element, and a third optical element for emitting or receiving light, a lens for transmitting or receiving light, and an optical system for guiding light from the optical elements into the lens or guiding light from the lens into the optical elements, wherein the first optical element is disposed on an optical axis of the lens so that an optical axis of the first optical element matches the optical axis of the lens, the second optical element is placed at a position distant from the optical axis of the lens to the side of the lens from the first optical element so that an optical axis of the second optical element crosses the optical axis of the lens with an inclination thereto at an acute angle, and the third optical element is placed at a position distant from the optical axis of the lens on a plane different from the second optical element so that an optical axis of the third optical element crosses the optical axis of the lens with an inclination thereto at an acute angle.

According to the configuration of the optical unit, the cross angle is adjusted three-dimensionally and as at an acute angle and the optical elements are placed so that the distances from the optical axis of the lens to the second and third optical elements are shortened, thus the optical unit can be miniaturized.

In the sixth aspect of the invention, it is preferable that the third optical element is a light emission element for emitting green band light.

According to the configuration, the attenuation effect of the optical system on the light emission element for emitting green band light with the smallest light reception detection output as compared with the light emission element for emitting blue or red band light can be decreased.

According to a seventh aspect of the invention, there is provided an optical unit for emitting light, comprising a blue light emission element, a green light emission element, a red light emission element, a projection lens for transmitting light from the light emission elements, a first dichroic mirror capable of reflecting light of light emission wavelength of the green light emission element and allowing light of light emission wavelengths of the blue and red light emission elements to pass through, and a second dichroic mirror capable of reflecting light of light emission wavelength of one of the blue and red light emission elements and allowing light of light emission wavelengths of the other to pass through, wherein optical path lengths from the light emission elements to the projection lens equal and the green light emission element is disposed nearest to the projection lens among the light emission elements.

According to the configuration, the light reception detection output of each color is adjusted for suppressing variations. The optical element with the lowest light reception detection output among the optical elements is disposed at an optical position with the minimum attenuation effect as compared with others, namely, at a position near the projection lens, whereby bottom up of ability of the entire optical unit is enabled.

DETAILED DESCRIPTION OF THE PREFERRED EMBODIMENTS

Referring now to the accompanying drawings, there are shown preferred embodiments of the invention.

A first embodiment of the invention will be discussed.

Figure 1:
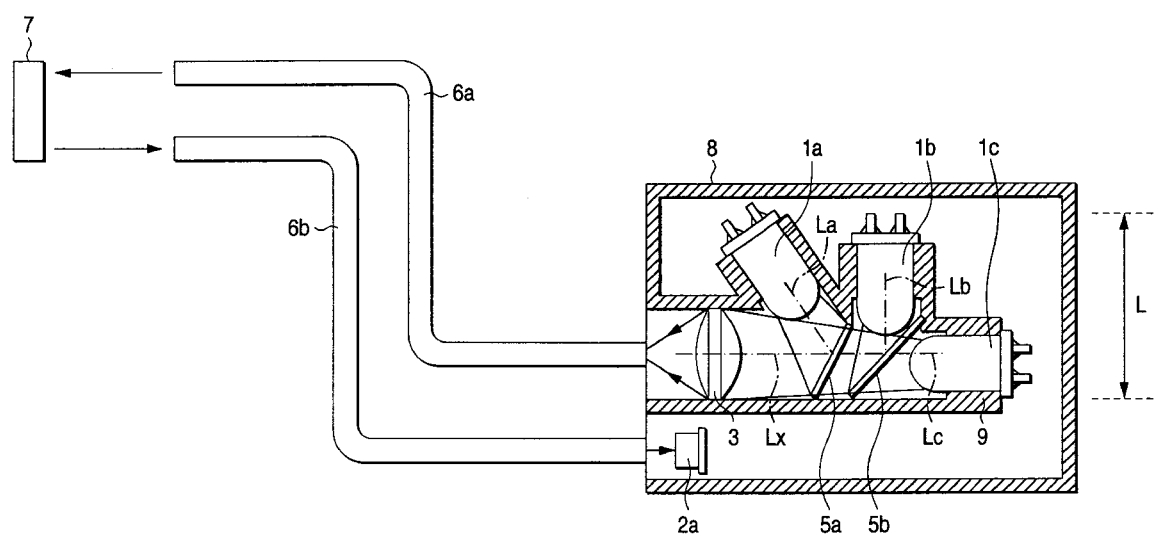
FIG. 1 is a sectional view of the main part of a fiber type photoelectric switch according to the first embodiment of the invention.

FIG. 1 is a sectional view of the main part of a fiber type photoelectric switch according to the first embodiment of the invention.

The photoelectric switch shown in FIG. 1 can also be used as a color discrimination sensor. It comprises a housing 8, a holder 9 placed in the housing 8, three light emission elements 1*a*, 1*b*, and 1*c*, a projection lens 3, and two dichroic mirrors 5*a* and 5*b* disposed in the holder 9, a detection light reception element 2*a* below the holder 9, and a pair of optical fibers 6*a* and 6*b* attached to the front of the housing 8.

The light emission elements 1*a*, 1*b*, and 1*c* are, for example, light emitting diodes and emit light of different wavelength bands. For example, the light emission element 1*a* emits green light (that is, a light having a range of wavelength corresponding to green), the light emission element 1*b* emits blue light (that is, a light having a range of wavelength corresponding to blue), and the light emission element 1*c* emits red light (that is, a light having a range of wavelength corresponding to red). The light emission element 1*c* is placed so that an optical axis Lc of the light emission element 1*c* matches an optical axis Lx of the projection lens 3. The light emission element 1*b* is placed so that an optical axis Lb of the light emission element 1*b* crosses the optical axis Lx of the projection lens 3 at right angles. The light emission element 1*a* is placed so that an optical axis La of the light emission element 1*a* crosses the optical axis Lx of the projection lens 3 at an angle of greater than 0 degrees and smaller than 90 degrees.

Each of the dichroic mirrors 5a and 5b reflects light of a specific wavelength band and allows light of any other wavelength to pass through. In the embodiment, the dichroic mirror 5a reflects light of the light emission wavelength of the light emission element 1a and allows light of any other wavelength to pass through. The dichroic mirror 5b reflects light of the light emission wavelength of the light emission element 1b and allows light of any other wavelength to pass through.

The dichroic mirror 5b is placed so as to allow light emitted from the light emission element 1c to pass through and guide the light into the projection lens 3 and reflect light emitted from the light emission element 1b and guide the light into the projection lens 3. The dichroic mirror 5a is placed so as to allow light penetrating the dichroic mirror 5b from the light emission element 1c and light reflected on the dichroic mirror 5b from the light emission element 1b to pass through and guide the light into the projection lens 3 and reflect light emitted from the light emission element 1a and guide the light into the projection lens 3.

The light emission elements 1a, 1b, and 1c, the projection lens 3, and the dichroic mirrors 5a and 5b are placed so that the total of the optical path length from the light emission element 1a to the dichroic mirror 5a and the optical path length from the dichroic mirror 5a to the projection lens 3, the total of the optical path length from the light emission element 1b to the dichroic mirror 5b and the optical path length from the dichroic mirror 5b to the projection lens 3, and the optical path length from the light emission element 1c to the projection lens 3 substantially match.

As shown in FIG. 1, the projection lens 3 is placed so as to gather light from the light emission elements 1a, 1b, and 1c at one end of the optical fiber 6a.

The detection light reception element 2a is made of a photodiode, for example. It is placed so as to face one end of the optical fiber 6b.

The placement order of the light emission elements 1a, 1b, and 1c is determined by the light emission power of the light emission elements and the spectral sensitivity of a photodiode used as the light reception element 2a, as parameters. The determination method of the placement order will be discussed.

Figure 2:
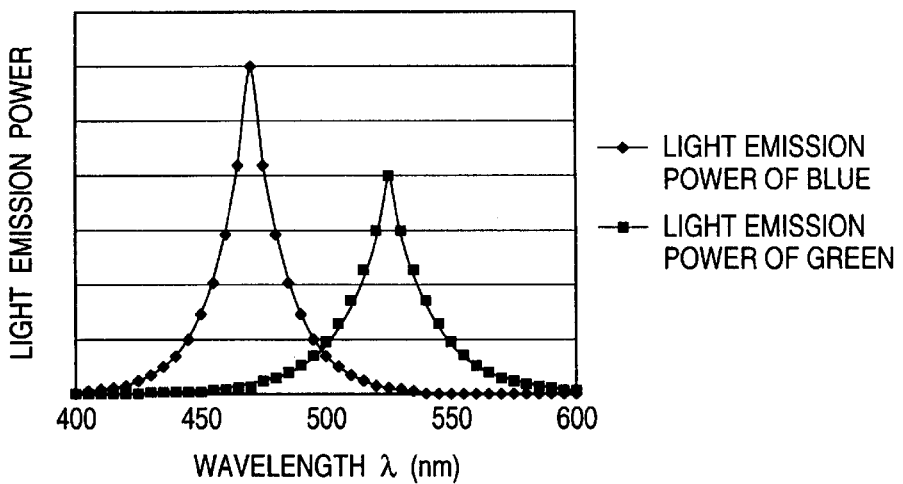
FIG. 2 is a graph to show the light emission power of light emission elements shown in FIG. 1.

The light emission power of the light emission element 1 generally has a distribution characteristic responsive to the wavelength as shown in FIG. 2 which shows the relationship between the wavelength and light emission power, and luminescent color can be recognized visually from the wavelength distribution of the light emission power. For example, in FIG. 2, light emitted from the blue light emission element (with the light emission power having the peak 470 nm and distributed in the range of 400 nm to 550 nm) can be recognized as blue and light emitted from the green light emission element (with the light emission power having the peak 525 nm and distributed in the range of 450 nm to 600 nm) can be recognized as green. Although the light emission power of the red light emission element is not shown, it has a peak at a point near 700 nm.

Figure 3:
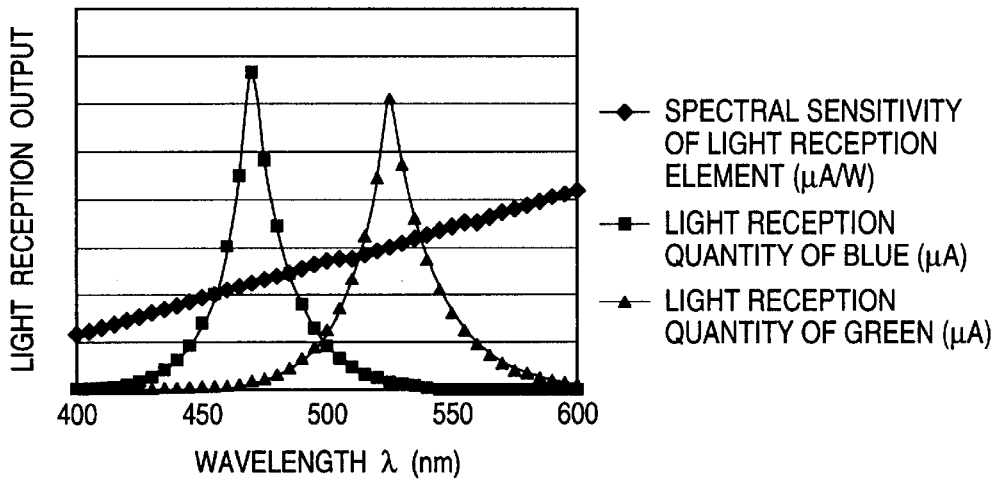
FIG. 3 is a graph to show output of a light reception element shown in FIG. 1.

To use such light emission elements 1 as a light source of a light discrimination sensor, etc., a photodiode or a phototransistor is used as the light reception element 2a; it changes in sensitivity depending on the wavelength of incident light. Generally, the silicon family photodiode or phototransistor has the highest sensitivity in the range of 800 nm to 1000 nm in the infrared area, namely, unvisual wavelength band; the sensitivity lowers in any other wavelength range. FIG. 3 shows an example of the spectral sensitivity of the light reception element rising toward 800 nm from left to right.

To use the light emission elements 1 and the light reception element 2a actually to form a color discrimination sensor, etc., the level of a detection signal that can be taken out as light reception element output is determined by the relationship between the wavelength distribution of the light emission power of the light emission elements 1 and the spectral sensitivity difference depending on the wavelength of the light reception element 2a. In other words, to use the light emission elements 1a, 1b, and 1c different in light emission wavelength, from the relationship between the light emission power and the sensitivity difference of the light reception element 2a for each wavelength, the light reception element output corresponding to one color light emission element differs from the light reception element output corresponding to another and there is the light emission element causing the signal level of the light reception element output to reach the minimum.

Specifically, the signal levels can be compared, for example, as follows:

The light emission power depending on each of the wavelengths of the light emission elements 1a, 1b, and 1c is represented as wavelength function In ($\lambda$) (n=1, 2, 3):

$$1a = I_1 (\lambda)$$

$$1b = I_2 (\lambda)$$

$$1c = I_3 (\lambda)$$

where $\lambda$: Light emission wavelength.

The spectral sensitivity for each wavelength of the light reception element 2a is represented as $$p(\lambda)$$

The light reception output corresponding to each light emission element of the wavelength band, namely, the output signal level of the light reception element, Ln (N=1, 2, 3), is found as follows:

$$L_1 = \int I_1 (\lambda) \cdot p (\lambda) \, d\lambda$$

$$L_2 = \int I_2 (\lambda) \cdot p (\lambda) \, d\lambda$$

$$L_3 = \int I_3 (\lambda) \cdot p (\lambda) \, d\lambda$$

where $L_1$: Light reception output of light emission element 1a;

$L_2$: Light reception output of light emission element 1b; and $L_3$: Light reception output of light emission element 1c.

The light reception output is found by integrating the product of the light emission power of the light emission element and the spectral sensitivity of the light reception element with respect to the wavelength ($\lambda$). That is, it is found by integrating the light reception quantity shown in FIG. 4 relative to the light reception element.

By comparing $L_1$, $L_2$, and $L_3$ thus found, which of the light emission elements has the lowest signal level as light reception element output can be checked.

Next, a specific example will be discussed wherein the above-described comparison method is used to indicate which of the light emission element for emitting green band light, which will be hereinafter referred to as the green LED, and the light emission element for emitting blue band light, which will be hereinafter referred to as the blue LED, has a lower signal level as light reception element output.

Examples of the numeric values of the green and blue LEDs thus found are described in a table below.

TABLE

| wavelength | B | G | spectral sensitivity PD | light reception output B*PD | G*PD | luminosity factor | brightness b | g |
|---|---|---|---|---|---|---|---|---|
| 400 | 0.041 | 0.002 | 0.118 | 0.005 | 0.000 | 0.000 | 0.000 | 0.000 |
| 405 | 0.058 | 0.002 | 0.125 | 0.007 | 0.000 | 0.001 | 0.000 | 0.000 |
| 410 | 0.083 | 0.003 | 0.133 | 0.011 | 0.000 | 0.001 | 0.000 | 0.000 |
| 415 | 0.119 | 0.004 | 0.140 | 0.017 | 0.000 | 0.003 | 0.000 | 0.000 |
| 420 | 0.169 | 0.005 | 0.148 | 0.025 | 0.001 | 0.004 | 0.001 | 0.000 |
| 425 | 0.242 | 0.006 | 0.155 | 0.038 | 0.001 | 0.008 | 0.002 | 0.000 |
| 430 | 0.346 | 0.008 | 0.163 | 0.058 | 0.001 | 0.012 | 0.004 | 0.000 |
| 435 | 0.494 | 0.011 | 0.170 | 0.084 | 0.002 | 0.017 | 0.009 | 0.000 |
| 440 | 0.706 | 0.015 | 0.178 | 0.125 | 0.003 | 0.023 | 0.016 | 0.000 |
| 445 | 1.008 | 0.020 | 0.185 | 0.187 | 0.004 | 0.031 | 0.031 | 0.001 |
| 450 | 1.441 | 0.027 | 0.193 | 0.277 | 0.005 | 0.038 | 0.055 | 0.001 |
| 455 | 2.058 | 0.036 | 0.200 | 0.412 | 0.007 | 0.049 | 0.101 | 0.002 |
| 460 | 2.940 | 0.048 | 0.208 | 0.610 | 0.010 | 0.060 | 0.176 | 0.003 |
| 465 | 4.200 | 0.063 | 0.215 | 0.903 | 0.014 | 0.076 | 0.317 | 0.005 |
| 470 | 6.000 | 0.084 | 0.223 | 1.335 | 0.019 | 0.091 | 0.546 | 0.008 |
| 475 | 4.200 | 0.113 | 0.230 | 0.966 | 0.026 | 0.115 | 0.483 | 0.013 |
| 480 | 2.940 | 0.150 | 0.238 | 0.698 | 0.036 | 0.139 | 0.409 | 0.021 |
| 485 | 2.058 | 0.200 | 0.245 | 0.504 | 0.049 | 0.174 | 0.357 | 0.035 |
| 490 | 1.441 | 0.267 | 0.253 | 0.364 | 0.067 | 0.208 | 0.300 | 0.056 |
| 495 | 1.008 | 0.356 | 0.260 | 0.262 | 0.093 | 0.266 | 0.268 | 0.095 |
| 500 | 0.706 | 0.475 | 0.268 | 0.189 | 0.127 | 0.323 | 0.228 | 0.153 |
| 505 | 0.494 | 0.633 | 0.275 | 0.136 | 0.174 | 0.413 | 0.204 | 0.261 |
| 510 | 0.346 | 0.844 | 0.283 | 0.098 | 0.238 | 0.503 | 0.174 | 0.424 |
| 515 | 0.242 | 1.125 | 0.290 | 0.070 | 0.326 | 0.607 | 0.147 | 0.682 |
| 520 | 0.169 | 1.500 | 0.298 | 0.050 | 0.446 | 0.710 | 0.120 | 1.065 |
| 525 | 0.119 | 2.000 | 0.305 | 0.036 | 0.610 | 0.786 | 0.093 | 1.572 |
| 530 | 0.083 | 1.500 | 0.313 | 0.026 | 0.469 | 0.862 | 0.072 | 1.293 |
| 535 | 0.058 | 1.125 | 0.320 | 0.019 | 0.360 | 0.908 | 0.053 | 1.022 |
| 540 | 0.041 | 0.844 | 0.328 | 0.013 | 0.276 | 0.954 | 0.039 | 0.805 |
| 545 | 0.028 | 0.633 | 0.335 | 0.010 | 0.212 | 0.975 | 0.028 | 0.617 |
| 550 | 0.020 | 0.475 | 0.343 | 0.007 | 0.163 | 0.995 | 0.020 | 0.472 |
| 555 | 0.014 | 0.356 | 0.350 | 0.005 | 0.125 | 0.995 | 0.014 | 0.354 |
| 560 | 0.010 | 0.267 | 0.358 | 0.003 | 0.095 | 0.995 | 0.010 | 0.266 |
| 565 | 0.007 | 0.200 | 0.365 | 0.002 | 0.073 | 0.974 | 0.007 | 0.195 |
| 570 | 0.005 | 0.150 | 0.373 | 0.002 | 0.056 | 0.952 | 0.005 | 0.143 |
| 575 | 0.003 | 0.113 | 0.380 | 0.001 | 0.043 | 0.911 | 0.003 | 0.103 |
| 580 | 0.002 | 0.084 | 0.388 | 0.001 | 0.033 | 0.870 | 0.002 | 0.073 |
| 585 | 0.002 | 0.063 | 0.395 | 0.001 | 0.025 | 0.814 | 0.001 | 0.052 |
| 590 | 0.001 | 0.048 | 0.403 | 0.000 | 0.019 | 0.757 | 0.001 | 0.036 |
| 595 | 0.001 | 0.036 | 0.410 | 0.000 | 0.015 | 0.694 | 0.001 | 0.025 |
| 600 | 0.001 | 0.027 | 0.418 | 0.000 | 0.011 | 0.631 | 0.000 | 0.017 |
| 605 | 0.000 | 0.020 | 0.425 | 0.000 | 0.009 | 0.567 | 0.000 | 0.011 |
| 610 | 0.000 | 0.015 | 0.433 | 0.000 | 0.007 | 0.503 | 0.000 | 0.008 |
| 615 | 0.000 | 0.011 | 0.440 | 0.000 | 0.005 | 0.442 | 0.000 | 0.005 |
| 620 | 0.000 | 0.008 | 0.448 | 0.000 | 0.004 | 0.381 | 0.000 | 0.003 |
| 625 | 0.000 | 0.006 | 0.455 | 0.000 | 0.003 | 0.323 | 0.000 | 0.002 |
| 630 | 0.000 | 0.005 | 0.463 | 0.000 | 0.002 | 0.265 | 0.000 | 0.001 |
| 635 | 0.000 | 0.004 | 0.470 | 0.000 | 0.002 | 0.220 | 0.000 | 0.001 |
| 640 | 0.000 | 0.003 | 0.478 | 0.000 | 0.001 | 0.175 | 0.000 | 0.000 |
| 645 | 0.000 | 0.002 | 0.485 | 0.000 | 0.001 | 0.141 | 0.000 | 0.000 |
| 650 | 0.000 | 0.002 | 0.493 | 0.000 | 0.001 | 0.107 | 0.000 | 0.000 |

The first column of the table indicates the wavelengths of light in 5-nm steps of 400 nm to 650 nm. The second column indicates the light emission power B of the blue LED, the third column indicates the light emission power G of the green LED, the fourth column indicates the spectral sensitivity PD of the light reception element, the fifth column indicates light reception element output when the blue LED emits light B*PD (product of light emission power B of the blue LED and spectral sensitivity PD), and the sixth indicates light reception element output when the green LED emits light G*PD (product of light emission power G of the green LED and spectral sensitivity PD).

To show the relationships between the wavelengths and the light emission power at the blue and green LEDs, FIG. 2 is provided by plotting the numeric values under the second and third columns of the above-mentioned Table.

Next, to show the spectral sensitivity of the light reception element relative to the wavelengths and the relationships between the wavelengths corresponding to light emission outputs of the blue and green LEDs and light reception output of the light reception element, FIG. 3 is provided by plotting the numeric values of the spectral sensitivity of the light reception element under the fourth column of the above-mentioned Table, the numeric values of output of the light reception element indicated under the fifth column (product of light emission power of the blue LED and spectral sensitivity of the light reception element), and the numeric values of output of the light reception element indicated under the sixth column (product of light emission power of the green LED and spectral sensitivity of the light reception element).

Referring to the above-mentioned numeric Table, the integral value of the light reception element output of the green LED ($L_1 = \int I_1(\lambda) \cdot p(\lambda) \, d\lambda$) is compared with the integral value of the light reception element output of the blue LED ($L_2 = \int I_2(\lambda) \cdot p(\lambda) \, d\lambda$) in the wavelength range of 400 nm to 650 nm in 5-nm steps. In the above-mentioned Table, the sum total (possibly, representing the integral value) of the light reception element output of the green LED is smaller than that of the blue LED. Therefore, it is understood that the integral value of the light reception element output corresponding to the blue LED is greater than that corresponding to the green LED and that the level of the light reception element output corresponding to the blue LED becomes higher.

A comparison with the level of the light reception element output corresponding to the red LED can also be made by a similar method. However, the level of the light reception element output corresponding to the red LED will not be discussed in detail, because it is clear that the level of the light reception element output corresponding to the red LED becomes larger than that corresponding to the blue or green LED as generally a light reception element of a silicon-family photodiode, phototransistor, etc., has a spectral sensitivity rising from left to right with a peak in the area of 800 nm or more and the red LED has the light emission output peak near 700 nm.

Figure 4:
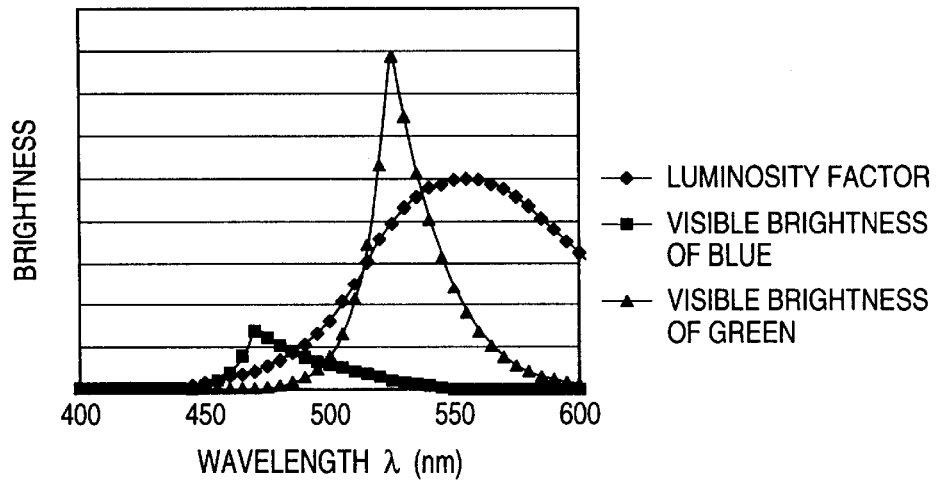
FIG. 4 is a graph to show brightness according to luminosity factor shown in FIG. 3.

Further, to show the relationships among the luminosity factor of a human being relative to the wavelengths, visible brightness of light emission output of the blue LED, and visible brightness of light emission output of the green LED, FIG. 4 is provided by plotting the numeric values listed under the seventh to ninth columns of the Table.

As shown in FIG. 4 and the Table, the brightness of the light emission element of each color according to the luminosity factor observed with human being eyes can be found by the product of the light emission power of each LED and luminosity factor. In the Table, the sum total of the brightness of the green LED in the wavelength range of 400 nm to 650 nm in 5-nm steps is larger than that of the brightness of the blue LED. Therefore, the visible brightness of the light emission output of the blue LED becomes considerably smaller than that of the green LED.

A comparison with the visible brightness of the light emission output of the red LED can also be made by a similar method.

As seen from the description made so far, the visible brightness of the light emission output of the green LED becomes a higher level than that of the blue LED, but the actual light reception output of the light reception element corresponding to the green LED becomes smaller than that corresponding to the blue LED.

The inventor considers the placement order of the light emission elements of the whole optical unit based on the knowledge. That is, the optical system is designed by assigning the highest priority to the light emission element which becomes the lowest level when the light reception outputs corresponding to the light sources of the wavelengths, namely, the output signal levels of the light reception element are compared. In other words, light is emitted from each light source and is received at the light reception element under the same condition and the light source having the smallest output signal level is assigned the highest priority for designing the optical system.

Specifically, as shown in FIG. 1, the green LED 1a whose light reception element output level is the lowest is disposed optically and physically nearest to the projection lens 3, the blue LED 1b whose light reception element output level is the second lowest is disposed next to the green LED 1a, and the red LED 1c whose light reception element output level is the highest is disposed most distant from the projection lens 3. The reason why the LEDs are thus placed is that while light from the red LED 1c arrives at the projection lens 3, it is attentuated twice as it penetrates the dichroic mirror 5b and the dichroic mirror 5a and that while light from the blue LED 1b arrives at the projection lens 3, it is attenuated twice as it is reflected on the dichroic mirror 5b and penetrates the dichroic mirror 5a, but while light from the green LED 1a arrives at the projection lens 3, it is attenuated only once as it is only reflected on the dichroic mirror 5a.

Although placement of the light emitting diodes can be thus determined by making reference to the light reception element output in FIG. 3 and the Table, the calculation value data varies with the elements and drive conditions and is not constant. The order of red, green, and blue changes depending on the characteristics of the elements. Although blue B and green G have been examined, red R can also be examined likewise.

According to such placement, light emitted from the light emission element causing the output at the light reception element to reach the minimum level is made to skip penetration of the dichroic mirrors 5a and 5b for lessening the attenuation degree of the output, so that the incident light quantity on the light reception element can be raised relatively for adjusting the level of the corresponding color light reception element output.

The optical fiber 6a transmits light gathered at one end through the projection lens 3 to the other end and guides the light into a detection position 7 and the optical fiber 6b transmits light reflected from the detection position 7 and incident on one end to the other end and guides the light into the detection light reception element 2a, whereby if the distance from the photoelectric switch to the detection position 7 is longer than the tolerance that can be detected in the configuration using the LEDs, the optical fibers 6a and 6b enable light transmission and detection.

The light emission elements 1a, 1b, and 1c are turned on in order in a time division way. If the light emission element 1a is turned on, green light emitted from the light emission element 1a is reflected on the dichroic mirror 5a and is guided through the projection lens 3 and the optical fiber 6a into the detection position. If the light emission element 1b is turned on, blue light emitted from the light emission element 1b is reflected on the dichroic mirror 5b, penetrates the dichroic mirror 5a, and is guided through the projection lens 3 and the optical fiber 6a into the detection position. If the light emission element 1c is turned on, red light emitted from the light emission element 1c penetrates the dichroic mirrors 5b and 5a and is guided through the projection lens 3 and the optical fiber 6a into the detection position. If an object 7 exists at the detection position, reflected light from the object 7 is guided through the optical fiber 6b into the detection light reception element 2a. Color of the object 7 can be detected according to color detection based on the color light reception quantities of green, blue, and red, light reception quantity percentage of R, G, and B, etc., in addition to shape and position detection of the object (workpiece) 7 based on reflected light and penetrating light received at the detection light reception element 2a.

Change can also be made whenever necessary so that the object (workpiece) 7 can be detected according to penetrating light received at the detection light reception element 2a by placing the optical fiber 2b on the light reception side in FIG. 1 on the opposite side to the object 7.

Figure 5:
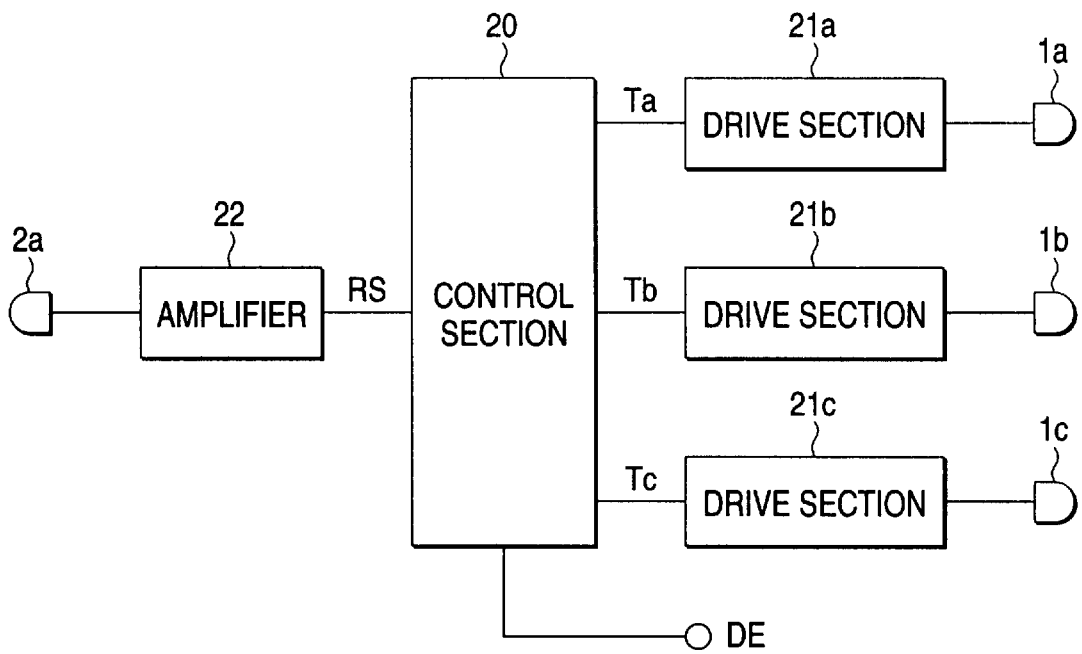
FIG. 5 is a block diagram to show a control system of the photoelectric switch shown in FIG. 1.

FIG. 5 is a block diagram of a control system of the photoelectric switch shown in FIG. 1.

In FIG. 5, a control section 20 gives light emission timing control signals Ta, Tb, and Tc for controlling the light emission timings of the light emission elements 1a, 1b, and 1c to drive sections 21a, 21b, and 21c respectively. The drive sections 21a, 21b, and 21c respond to the light emission timing control signals Ta, Tb, and Tc with driving of the light emission elements 1a, 1b, and 1c respectively.

An output signal of the detection light reception element 2a is amplified by an amplifier 22a and is given to the control section 20 as a light reception signal RS. The control section 20 outputs a detection signal DE based on the level of the light reception signal RS. For example, if the level of the light reception signal RS is higher than a predetermined threshold value, the control section 20 outputs the detection signal DE high; if the level of the light reception signal RS is lower than the predetermined threshold value, the control section 20 outputs the detection signal DE low.

In the photoelectric switch of the embodiment, the light emission element 1a and the projection lens 3 are placed so that the optical axis La of the light emission element 1a near to the projection lens 3 crosses the optical axis LX of the projection lens 3 with an inclination thereto, so that the width of the holder 9 of the photoelectric switch, L, can be lessened while the optical path lengths from the light emission elements 1a, 1b, and 1c to the projection lens 3 are held equal to each other.

Next, a second embodiment of the invention will be discussed with reference to FIG. 6.

Figure 6:
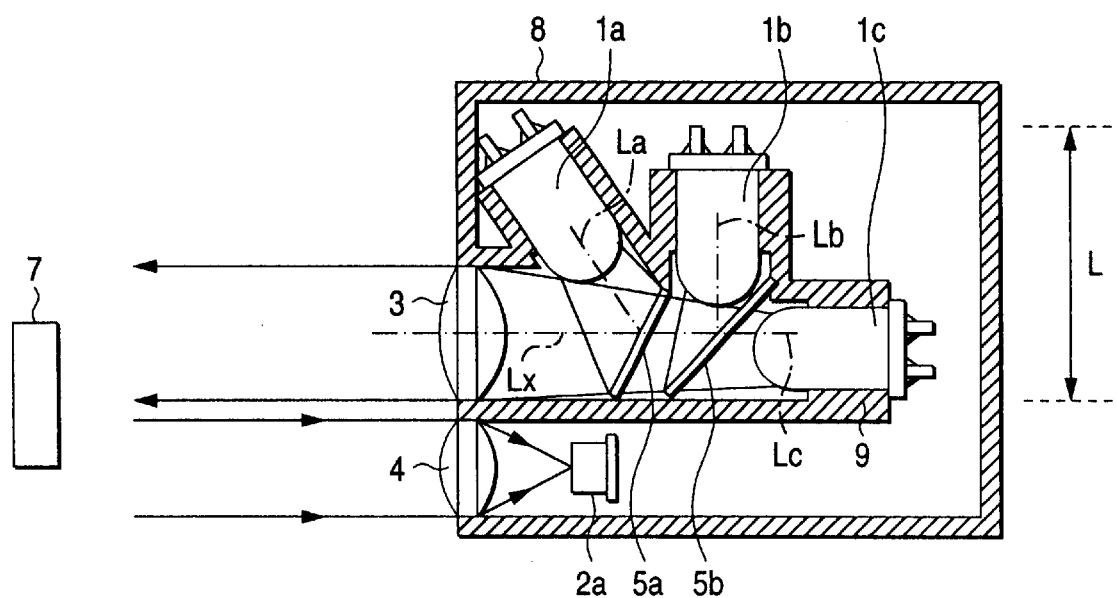
FIG. 6 is a sectional view of the main part of a photoelectric switch according to a second embodiment of the invention.

FIG. 6 is a sectional view of the main part of a photoelectric switch according to the second embodiment of the invention.

Figure 7:
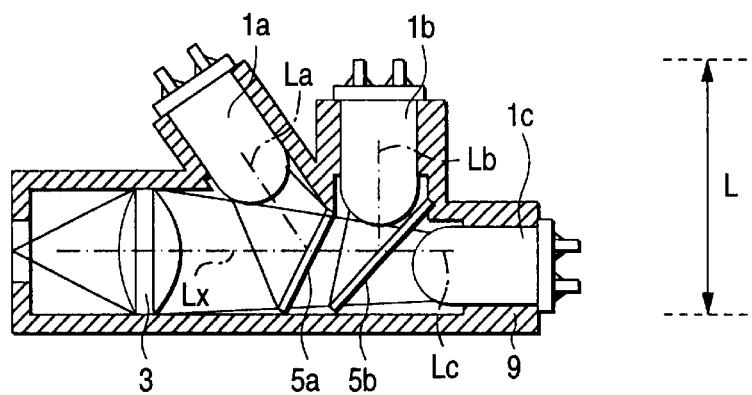
FIG. 7 is a sectional view of the main part of an optical unit according to a third embodiment of the invention.

The photoelectric switch shown in FIG. 7 differs from the photoelectric switch in FIG. 1 in that it does not comprise optical fibers and is provided with a light reception lens 4.

A projection lens 3 transmits light from light emission elements 1a, 1b, and 1c to a detection position. The light reception lens 4 gathers light from the detection position at a detection light reception element 2a. If an object 7 exists at the detection position, reflected light from the object 7 is gathered through the light reception lens 4 at the detection light reception element 2a.

The configuration of a control system of the photoelectric switch shown in FIG. 6 may be the same as the configuration shown in FIG. 5.

Also in the photoelectric switch of the embodiment, the light emission element 1a and the projection lens 3 are placed so that an optical axis La of the light emission element 1a near to the projection lens 3 crosses an optical axis LX of the projection lens 3 with an inclination thereto, so that the width of the holder 9 of the photoelectric switch, L, can be lessened while the optical path lengths from the light emission elements 1a, 1b, and 1c to the projection lens 3 are held equal to each other.

Next, a third embodiment of the invention will be discussed with reference to FIG. 7.

FIG. 7 is a sectional view of the main part of an optical unit according to the third embodiment of the invention.

As shown in FIG. 7, in an optical unit utilized as a light transmission unit, three light emission elements 1a, 1b, and 1c, a projection lens 3, and two dichroic mirrors 5a and 5b are disposed in a holder 9. The light emission elements 1a, 1b, and 1c, the dichroic mirrors 5a and 5b, and the projection lens 3 are placed as those of the photoelectric switch in FIG. 1.

In the optical unit of the embodiment, the light emission element 1a and the projection lens 3 are placed so that an optical axis La of the light emission element 1a near to the projection lens 3 crosses an optical axis LX of the projection lens 3 with an inclination thereto, so that the width of the optical unit, L, can be lessened while the optical path lengths from the light emission elements 1a, 1b, and 1c to the projection lens 3 are held equal to each other.

Figure 8:
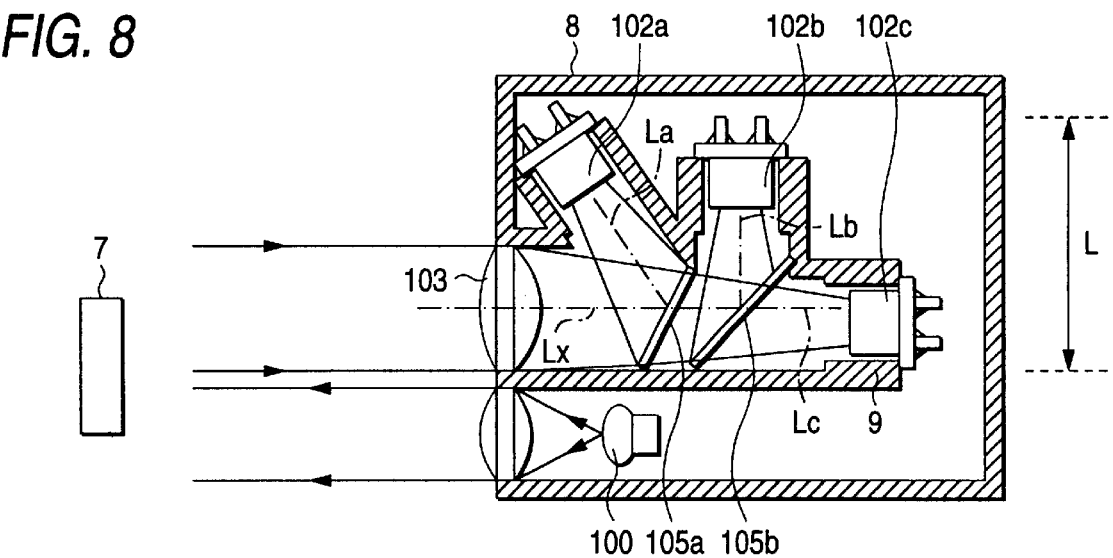
FIG. 8 is a sectional view of the main part of a modified example of the optical unit according to the third embodiment of the invention.

The optical unit in FIG. 7 has been described as a light transmission unit, but the light emission elements 1a, 1b, and 1c can be all replaced with light reception elements, for example, to form a light reception unit. FIG. 8 shows a modified example of the optical unit for transmitting light of a white light 100 (for example, a halogen lamp) to an object 7 and receiving light reflected on the object 7 or light penetrating the object 7, thereby detecting information on the object 7. Green light G passing through a lens 103 is reflected on a dichroic mirror 105a and is received at a green light reception element 102a. Blue light B passing through the lens 103 passes through the dichroic mirror 105a, is reflected on a dichroic mirror 105b, and is received at a blue light reception element 102b. Red light R passing through the lens 103 passes through the dichroic mirrors 105a and 105b and is received at a red light reception element 102c.

Next, a fourth embodiment of the invention will be discussed with reference to FIG. 9.

Figure 9:
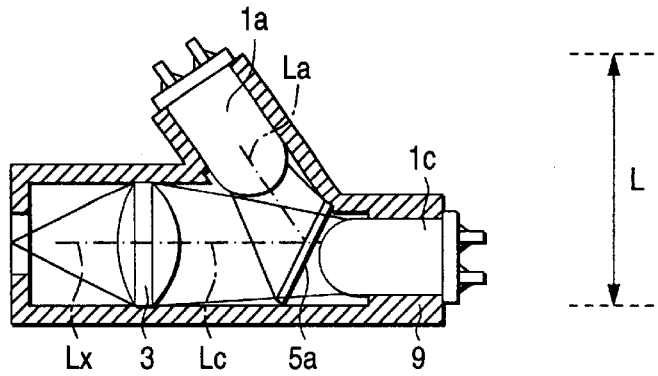
FIG. 9 is a sectional view of the main part of an optical unit according to a fourth embodiment of the invention.

FIG. 9 is a sectional view of the main part of an optical unit according to the fourth embodiment of the invention.

The embodiment is a configuration example comprising two optical elements (light emission or reception elements).

As shown in FIG. 9, two light emission elements 1a and 1c, a projection lens 3, and a dichroic mirror 5a is placed in a holder 9. The light emission element 1c is placed so that an optical axis LC of the light emission element 1c matches an optical axis LX of the projection lens 3. The light emission element 1a is placed so that an optical axis La of the light emission element 1a crosses the optical axis LX of the projection lens 3 at an angle of greater than 0 degrees and smaller than 90 degrees (acute angle).

The total of the optical path length from the light emission element 1a to the dichroic mirror 5a and the optical path length from the dichroic mirror 5a to the projection lens 3 and the optical path length from the light emission element 1c to the projection lens 3 is set equal to each other.

According to the embodiment, the light emission element 1a and the projection lens 3 are placed so that the optical axis La of the light emission element 1a near to the projection lens 3 crosses the optical axis LX of the projection lens 3 with an inclination thereto, so that the width of the optical unit, L, can be lessened while the optical path lengths from the light emission elements 1a and 1c to the projection lens 3 are held equal to each other.

In the optical unit as shown in FIG. 9, a light reception element or elements may replace either or both of the light emission elements 1a and 1c. Particularly, a light reception element is provided in place of the light emission element 1a and a half mirror is used in place of the dichroic mirror 5a, whereby a small photoelectric switch comprising a light emission element 1c and a light reception element 1a can be formed.

Next, a fifth embodiment of the invention will be discussed with reference to FIG. 10.

The embodiment is a configuration example comprising optical elements placed in three dimensions.

FIGS. 10A and 10B are a front view and a plan view of the main part of an optical unit according to the fifth embodiment of the invention. In FIGS. 10A and 10B, a light emission element 1c is placed so that an optical axis Lc of the light emission element 1c matches an optical axis LX of a projection lens 3. A light emission element 1b is placed so that an optical axis Lb of the light emission element 1b crosses the optical axis LX of the projection lens 3 at an angle of greater than 0 degrees and smaller than 90 degrees (acute angle). A light emission element 1a is placed so that an optical axis La of the light emission element 1a crosses the optical axis LX of the projection lens 3 at an angle of greater than 0 degrees and smaller than 90 degrees (acute angle). Further, the optical axis Lb of the light emission element 1b is on a vertical plane and the optical axis La of the light emission element 1a is on a horizontal plane.

The total of the optical path length from the light emission element 1a to the dichroic mirror 5a and the optical path length from the dichroic mirror 5a to the projection lens 3, the total of the optical path length from the light emission element 1b to the dichroic mirror 5b and the optical path length from the dichroic mirror 5b to the projection lens 3, and the optical path length from the light emission element 1c to the projection lens 3 are set equal to each other.

Figure 10:
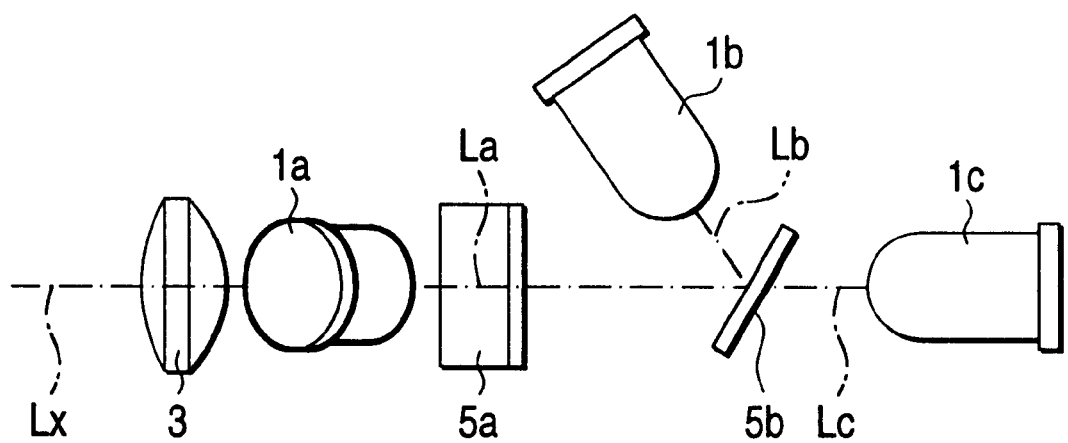
FIGS. 10A and 10B are a front view and a plan view of an optical unit according to a fifth embodiment of the invention.
Figure 10:
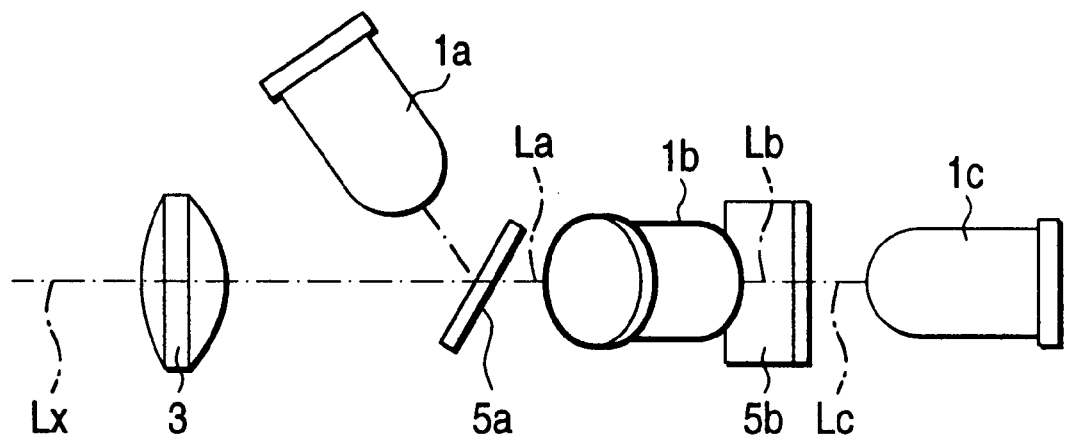
Figure 11:
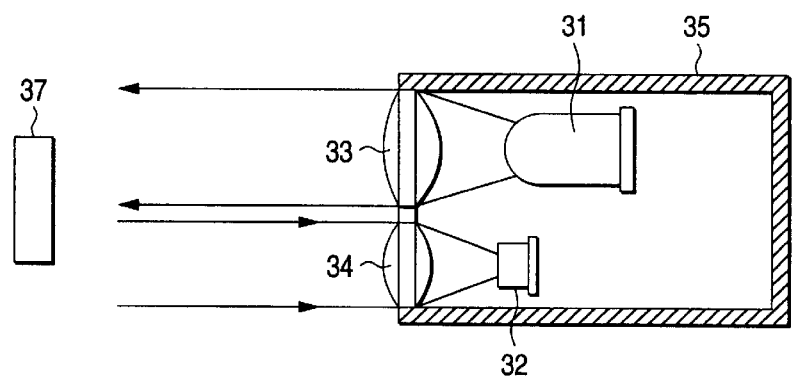
FIG. 11 is a sectional view of the main part of a photoelectric switch in a related art.
Figure 12:
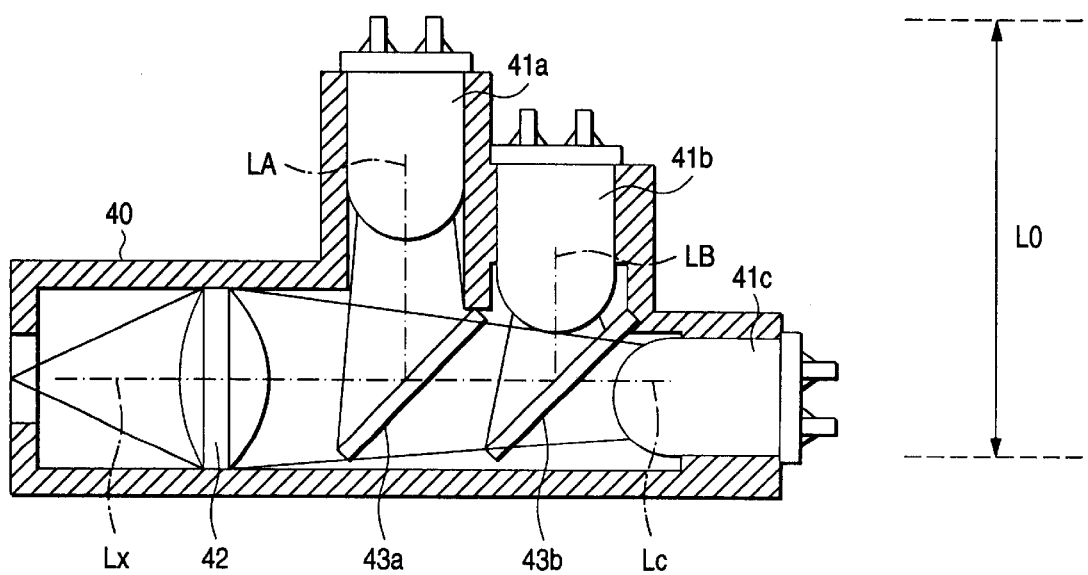
FIG. 12 is a sectional view of an optical unit in a related art.

Also in the optical unit in FIG. 10, a light reception element or elements can replace any or all of the light emission elements 1a, 1b, and 1c.

According to the embodiment, the optical axis La of the light emission element 1a and the optical axis Lb of the light emission element 1b cross the optical axis LX of the projection lens 3 with an inclination thereto, and are placed on different planes, in which case the dimensions of the optical unit can be shortened in two directions of the width and thickness.

Although the dichroic mirrors are used as the optical members of the optical system, other members of half mirrors, optical waveguides, etc., may be used as the optical members.

The projection lens comprises one lens, but may be formed of more than one lens.

As described above, according to the invention, in the configuration of the optical unit, the photoelectric switch, the fiber type photoelectric switch, and the color discrimination sensor, the optical members are placed so that the optical axis of at least one optical element crosses the optical axis of the lens with an inclination thereto, so that the unit can be miniaturized while the optical path lengths from the optical elements to the lens are held equal to each other.

According to the invention, the optical element with the lowest light reception detection output among the optical elements different in wavelength band is disposed at an optical position with the minimum attenuation effect, namely, at a position near the lens, whereby the light reception detection output of each color is adjusted for suppressing variations, so that the optical unit improved in product level can be provided.

The present invention is based on Japanese Patent Application No. Hei 10-138941, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An optical unit for emitting or receiving light, comprising:

a plurality of optical elements for emitting or receiving light;

a lens for transmitting or receiving light; and an optical system for guiding light from said optical elements into said lens or guiding light from said lens into said optical elements, wherein said plurality of optical elements and said lens are placed so that an optical axis of at least one of said optical elements crosses an optical axis of said lens with an inclination thereto, and the optical axis of another one of said optical elements is substantially aligned with said optical axis of said lens.

2. An optical unit for emitting or receiving light, comprising:

a plurality of optical elements for emitting or receiving light;

a lens for transmitting or receiving light; and an optical system for guiding light from said optical elements into said lens or guiding light from said lens into said optical elements, wherein said plurality of optical elements and said lens are placed so that an optical axis of at least one of said optical elements crosses an optical axis of said lens with an inclination thereto, and the optical axes of said plurality of optical elements are placed in three dimentions.

3. The optical unit as claimed in one of claims 1 and 2 wherein the optical element of said plurality of optical elements positioned nearest to said lens is a light emission element for emitting green band light.

4. A photoelectric switch for transmitting light to a detection position and receiving light reflected from the detection position or light penetrating the detection position, said photoelectric switch comprising:

a plurality of light emission elements for emitting light;

a projection lens for transmitting light from said plurality of light emission elements to the detection position in order;

an optical system for guiding light emitted from said plurality of light emission elements into said projection lens; and a light reception element for receiving light reflected from the detection position or light penetrating the detection position, wherein said plurality of light emission elements and said projection lens are placed so that an optical axis of at least one of said light emission elements crosses an optical axis of said projection lens with an inclination thereto, and the optical axis of another one of said optical elements is substantially aligned with said optical axis of said lens.

5. A photoelectric switch for transmitting light to a detection position and receiving light reflected from the detection position or light penetrating the detection position, said photoelectric switch comprising:

a plurality of light emission elements for emitting light;

a projection lens for transmitting light from said plurality of light emission elements to the detection position in order;

an optical system for guiding light emitted from said plurality of light emission elements into said projection lens; and a light reception element for receiving light reflected from the detection position or light penetrating the detection position, wherein said plurality of light emission elements and said projection lens are placed so that an optical axis of at least one of said light emission elements crosses an optical axis of said projection lens with an inclination thereto, and said light emission elements are placed in the ascending order of light reception element output values corresponding to light emitted from said light emission elements to said projection lens.

6. The fiber type photoelectric switch for transmitting light to a detection position and receiving light reflected from the detection position or light penetrating the detection position, said fiber type photoelectric switch comprising:

a plurality of light emission elements for emitting light;

a projection lens for transmitting light emitted from said light emission elements;

a first optical fiber for guiding the light emitted from said light emission elements and penetrating said projection lens into the detection position;

a detection light reception element; and a second optical fiber for guiding the light reflected from the detection position or the light penetrating the detection position into said detection light reception element, wherein said plurality of light emission elements and said projection lens are placed so that an optical axis of at least one of said light emission elements crosses an optical axis of said projection lens with an inclination thereto.

7. The fiber type photoelectric switch as claimed in claim 6, wherein said light emission elements are placed in the ascending order of light reception element output values corresponding to light emitted from said light emission elements to said projection lens.

8. A color discrimination sensor for transmitting light to an object and detecting color of the object based on light reflected from the object, said color discrimination sensor comprising:

a first light emission element, a second light emission element, and a third light emission element for emitting light in different wavelength bands;

a projection lens for transmitting light emitted from said first, second, and third light emission elements to the object;

an optical system for guiding light emitted from said first, second, and third light emission elements into said projection lens; and a detection light reception element for receiving the light reflected from the object, wherein said first light emission element is disposed on an optical axis of said projection lens so that an optical axis of said first light emission element matches the optical axis of said projection lens, said second light emission element is placed at a position distant from the optical axis of said projection lens to the side of said projection lens from said first light emission element so that an optical axis of said second light emission element crosses the optical axis of said projection lens at right angles, and said third light emission element is placed at a position distant from the optical axis of said projection lens to the side of said projection lens from said second light emission element so that an optical axis of said third light emission element crosses the optical axis of said projection lens with an inclination thereto at an acute angle.

9. The color discrimination sensor as claimed in claim 8, wherein said light emission elements are placed as said third light emission element, said second light emission element, and said first light emission element in the ascending order of light reception element output values corresponding to light emitted from said light emission elements to said projection lens.

10. An optical unit comprising:
a first optical element, a second optical element, and a third optical element for emitting or receiving light;
a lens for transmitting or receiving light; and
an optical system for guiding light from said optical elements into said lens or guiding light from said lens into said optical elements,
wherein said first optical element is disposed on an optical axis of said lens so that an optical axis of said first optical element matches the optical axis of said lens, said second optical element is placed at a position distant from the optical axis of said lens to the side of said lens from said first optical element so that an optical axis of said second optical element crosses the optical axis of said lens at right angles, and said third optical element is placed at a position distant from the optical axis of said lens to the side of said lens from said second optical element so that an optical axis of said third optical element crosses the optical axis of said lens with an inclination thereto at an acute angle.

11. The optical unit as claimed in claim 10, wherein said third optical element is a light emission element for emitting green band light.

12. An optical unit comprising:
a first optical element, a second optical element and a third optical element for emitting or receiving light;
a lens for transmitting or receiving light; and
an optical system for guiding light from said optical elements into said lens or guiding light from said lens into said optical elements,
wherein said first optical element is disposed on an optical axis of said lens so that an optical axis of said first optical element matches the optical axis of said lens, said second optical element is placed at a position distant from the optical axis of said lens to the side of said lens from said first optical element so that an optical axis of said second optical element crosses the optical axis of said lens with an inclination thereto at an acute angle, and said third optical element is placed at a position distant from the optical axis of said lens on a plane different from said second optical element so that an optical axis of said third optical element crosses the optical axis of said lens with an inclination thereto at an acute angle.

13. The optical unit as claimed in claim 12, wherein said third optical element is a light emission element for emitting green band light.

14. An optical unit for emitting light, comprising:
a blue light emission element;
a green light emission element;
a red light emission element;
a projection lens for transmitting light from said light emission elements;
a first dichroic mirror capable of reflecting light of light emission wavelength of said green light emission element and allowing light of light emission wavelengths of said blue and red light emission elements to pass through; and
a second dichroic mirror capable of reflecting light of light emission wavelength of one of said blue and red light emission elements and allowing light of light emission wavelengths of the other to pass through, wherein optical path lengths from said light emission elements to said projection lens are substantially equal, said green light emission element is disposed nearest to said projection lens among said light emission elements, and the optical axis of at least one of said light emission elements is at an inclination to the optical axis of said projection lens.

15. The optical unit as claimed in claim 14, wherein the optical axis of one of said blue and red light emission elements is substantially aligned with said optical axis of said projection lens.

16. An optical unit for emitting or receiving light, comprising:
a plurality of optical elements for emitting or receiving light;
a lens for transmitting or receiving light; and
an optical system for guiding light from said optical elements into said lens or guiding light from said lens into said optical elements, wherein said plurality of optical elements and said lens are placed so that an optical axis of at least one of said optical elements crosses an optical axis of said lens with an inclination thereto, and the optical element of said plurality of optical elements positioned nearest to said lens is a light emission element for emitting green band light.

* * * * *